(12) United States Patent
Tsukada et al.

(10) Patent No.: US 8,007,755 B2
(45) Date of Patent: Aug. 30, 2011

(54) CARBON FIBROUS STRUCTURE

(75) Inventors: Takayuki Tsukada, Tokyo (JP); Jiayi Shan, Tokyo (JP)

(73) Assignee: Hodogaya Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/502,063

(22) Filed: Jul. 13, 2009

(65) Prior Publication Data

US 2009/0274611 A1 Nov. 5, 2009

Related U.S. Application Data

(62) Division of application No. 11/147,742, filed on Jun. 8, 2005, now abandoned.

(30) Foreign Application Priority Data

Aug. 31, 2004 (JP) ................................. 2004-252601
Nov. 30, 2004 (JP) ................................. 2004-347385
Mar. 16, 2005 (JP) ................................. 2005-075437

(51) Int. Cl.
*D01F 9/12* (2006.01)

(52) U.S. Cl. .................. 423/447.3; 423/447.1; 977/752; 977/843

(58) Field of Classification Search ............... 423/447.1, 423/447.2, 447.3, 445 B; 977/742–754, 977/842–848; 428/367
See application file for complete search history.

(56) References Cited

U.S. PATENT DOCUMENTS

| | | | |
|---|---|---|---|
| 6,489,025 B2 | 12/2002 | Morita et al. | |
| 6,627,689 B2 * | 9/2003 | Iino et al. | 524/404 |
| 6,654,229 B2 | 11/2003 | Yanagisawa et al. | |
| 6,740,403 B2 | 5/2004 | Gogotsi et al. | |
| 6,790,426 B1 * | 9/2004 | Ohsaki | 423/447.2 |
| 6,953,562 B2 | 10/2005 | Baker et al. | |
| 7,365,100 B2 | 4/2008 | Kuper et al. | |
| 2003/0108479 A1 | 6/2003 | Baker et al. | |

OTHER PUBLICATIONS

Debabrata Pradhan, et. al., "Nano-Octopus: A New Form of Branching Carbon Nanofiber"; J. Nanosci. Nanotech. 2003, vol. 3, No. 3; American Scientific Publishers 2003; pp. 215-217.

Office Action issued Jan. 28, 2010, by the U.S. Patent and Trademark Office in related U.S. Appl. No. 11/083,616 (6 pages).

Office Action issued Apr. 2, 2010, by the U.S. Patent and Trademark Office in related U.S. Appl. No. 12/502,044 (18 pages).

(Continued)

*Primary Examiner* — Daniel C. McCracken
(74) *Attorney, Agent, or Firm* — Osha • Liang LLP

(57) ABSTRACT

A method for forming a carbon fibrous structure having a plurality of granular parts, to which a plurality of carbon fibers are bound, includes heating a mixture of a carbon source and a catalyst at a temperature between 800 ° C. and 1300 ° C. to produce aggregates of a first intermediate, heating the aggregates of the first intermediate to remove hydrocarbons, at a temperature between 800 ° C. and 1200 ° C. to produce aggregates of a first product, heating the aggregates of the first product at a temperature between 2400 ° C. and 3000 ° C. to produce aggregates of a final product; and pulverizing the aggregates of the final product such that area-based circle-equivalent mean diameter of each aggregate of the carbon fibrous structure of the product is 50-100 μm, bulk density of the carbon fibrous structure is 0.0001-0.02 g/cm³, and powder resistance under pressed density of 0.8g/cm³ is not more than 0.02 Ω·cm.

23 Claims, 7 Drawing Sheets

OTHER PUBLICATIONS

Huang, et al., "99.9% purity multi-walled carbon nanotubes by vacuum high-temperature annealing"; Carbon 2004; 41: 2585-2590.

Boehm, "Carbon From Carbon Monoxide disproportionation on Nickel and Iron Catalysts: Morphological Studies and Possible Growth Mechanisms"; Carbon vol. 11; pp. 583-590 (1973).

Safadi, et al., "Multiwalled Carbon Nanotue Polymer Composites: Synthesis and Characterization of Thin Films"; J. Appl. Poly. Sci. 2002; 84: 2660-2669.

Office Action issued Jun. 16, 2010, by the U.S. Patent and Trademark Office in related U.S. Appl. No. 11/093,616 (5 pages).

Office Action issued Oct. 26, 2010, by the U.S. Patent and Trademark Office in related U.S. Appl. No. 12/502,044 (25 pages).

Office Action issued Jun. 1, 2011, by the U.S. Patent and Trademark Office in related U.S. Appl. No. 11/093,616 (8 pages).

\* cited by examiner

CARBON FIBROUS STRUCTURE

CROSS-REFERENCE TO RELATED APPLICATIONS

This is a divisional application of U.S. patent application Ser. No. 11/147,742, filed on Jun. 8, 2005, which claims priorities of Japanese Patent Application No. 2004-252601, filed on Aug. 31, 2004, Japanese Patent Application No. 2004-347385, filed on Nov. 30, 2004, and Japanese Patent Application No. 2005-075437, filed on Mar. 16, 2005. These applications are incorporated by reference in their entireties.

BACKGROUND

1. Field of the Invention

This invention relates to fine carbon fibrous structures, particularly structures that are composed of fine carbon fibers wherein each of the fibers is composed of tubular laminates of fine carbon sheets and has a varied configuration. The fibrous structures are suitable as additives to be added to solid materials, such as resins, ceramics, metals, and etc., to improve the physical properties of the solid materials, such as electrical, mechanical, or thermal properties, and also as additives to be added to liquid materials, such as fuels, lubricant oils, and etc., to improve the physical properties of the liquid materials, such as thermal property.

2. Background Art

To date, carbon fibers have been used in various composite materials because of their good mechanical properties and high electrical conductivity. Recently, higher functionalities have come to be required for various materials. Additives which can improve physical properties, such as electrical, mechanical, or thermal properties, of a matrix comprised of solid materials, such as resins, ceramics, and metals, without damaging the characteristics of the matrix material have been sought after. Additionally, additives which can improve physical properties of liquids, such as fuels, oil, and lubricants have also been sought after. Hence, fine carbon fibers, such as carbon nano structures exemplified by the carbon nanotubes (hereinafter, referred to also as "CNT".), have been attracting public attention in various fields.

The graphite layers that make up the carbon nano structures are materials normally comprised of regular arrays of six-membered rings whose structures can bring about specific electrical properties, as well as chemically, mechanically, and thermally stable properties. As long as such fine carbon fibers can retain such properties upon combining and dispersing into solid materials, including various resins, ceramics, metals, etc., or into liquid materials, including fuels, lubricant agents, etc., their usefulness as additives for improving material properties can be expected.

On the other hand, however, such fine carbon fibers unfortunately show an aggregate state even just after their synthesis. When these aggregates are used as-is, the fine carbon fibers would be poorly dispersed, and thus the product obtained would not benefit from the desirable properties of the nano structures. Accordingly, given a desired property such as electrical conductivity for a matrix such as a resin, it is necessary that the fine carbon fibers would be added in a large amount.

Japanese patent No. 2862578 discloses a resin composition comprising aggregates wherein each of the aggregate is composed of mutually entangled carbon fibrils having 3.5-70 nm in diameter, and wherein the aggregates possess a diameter in the range of 0.10 to 0.25 mm with a maximum diameter of not more than 0.25 mm. It is noted that the numeric data such as the maximum diameter, diameter, and etc., for the carbon fibril aggregates are those measured prior to combining with a resin, as is clear from the descriptions in the examples and other parts of the patent literature. The related parts of Japanese patent No. 2862578 are incorporated herein by reference.

JP-2004-119386A discloses a composite material wherein a carbon fibrous material is added to the matrix. The carbon fibrous material is mainly comprised of aggregates, each of which is composed of carbon fibers having 50-5000 nm in diameter. The mutual contacting points among the carbon fibers are fixed with carbonized carbonaceous substance. Each of the aggregates has a size of 5 μm-500 μm. In this reference, the numeric data such as the size of aggregate, etc., are those measured prior to the combining into resin, too. The related parts of JP-2004-119386A are incorporated herein by reference.

Using carbon fiber aggregates such as those described above, it is expected that the dispersibility of carbon nano structures within a resin matrix will improve to a certain degree as compared with that of using bigger lumps of carbon fibers. Aggregates prepared by dispersing carbon fibrils under a certain shearing force, such as in a vibrating ball mill or the like, according to Japanese patent No. 2862578, however, have relatively high bulk densities. Thus, they do not fulfill the need for ideal additives that are capable of improving various characteristics, such as electrical conductivity, of a matrix effectively at minuscule dosages.

JP-2004-119386A discloses a carbon fibrous structure which is manufactured by heating carbon fibers in a state such that mutual contacting points among the carbon fibers are formed by compression molding after synthesis of the carbon fibers, and wherein fixing of fibers at the contacting points is done by carbonization of organic residues primarily attached to the surface of the carbon fibers, or carbonization of an organic compound additionally added as a binder. Since fixing of carbon fibers is performed by such a heat treatment after synthesis of the carbon fibers, the affixing forces at the contacting points are weak and do not result in good electrical properties of the carbon fibrous structures. When these carbon fibrous structures are added to a matrix such as a resin, the carbon fibers fixed at the contacting points are easily detached from each other, and the carbon fibrous structures are no longer maintained in the matrix. Therefore, it is not possible to construct preferable conductive paths in a matrix such that good electrical properties may be conferred on the matrix by a small additive amount of the fibrous structures. Furthermore, when a binder is added to promote fixing and carbonization at the contacting points, fibers in the obtained fibrous structures would have large diameters and inferior surface characteristics because the added binder is attached to the whole surface area of the fibers rather than to a limited area on the contacting points.

SUMMARY OF THE INVENTION

Therefore, this invention aims to provide new carbon fibrous structures capable of solving above mentioned problems in the art. This invention also aims to provide carbon fibrous structures which can improve the physical properties, such as electrical, mechanical, or thermal properties, of a matrix while maintaining other preferable properties of the matrix, when added to the matrix at a sufficiently small amount.

As a result of our diligent study for solving the above problems, we, the inventors, have found that the followings are effective at improving the various properties of a matrix, and finally accomplished the present invention:

To adapt carbon fibers having a diameter as small as possible;

To make a sparse structure of the carbon fibers where the fibers are mutually combined so that the fibers do not behave individually and which maintains their sparse state in the resin matrix; and.

To adapt carbon fibers that are designed to have a minimum amount of defects.

The present invention for solving the above mentioned problems is, therefore, exemplified by a carbon fibrous structure which comprises a three dimensional network of carbon fibers, each of which having an outside diameter of 15-100 nm, wherein the carbon fibrous structure comprises a granular part, at which two or more carbon fibers are tied together such that the carbon fibers extend outwardly therefrom, and wherein the granular part is produced in a growth process of the carbon fibers.

In one embodiment of the present invention, the carbon fibrous structures may have an area-based circle-equivalent mean diameter of 50-100 µm.

In another embodiment, the carbon fibrous structures may have a bulk density of 0.000-0.05 g/cm3

In still another embodiment, the carbon fibrous structures may have an $I_D/I_G$ ratio determined by Raman spectroscopy of not more than 0.2.

In a further embodiment, the carbon fibrous structures may have a combustion initiation temperature in air of not less than 750° C.

In a preferred embodiment, the diameter of the granular part is larger than the outside diameter of the carbon fibers.

In a further embodiment, the carbon fibrous structures are produced using as carbon sources of at least two carbon compounds, which have different decomposition temperatures.

According to embodiments of the present invention, since the carbon fibrous structures are comprised of three dimensionally configured carbon fibers having ultrathin diameters and bound together by a granular part produced in a growth process of the carbon fibers so that the concerned carbon fibers extend outwardly from the granular part, the carbon fibrous structures can disperse promptly into a matrix such as a resin upon adding, while maintaining their bulky structure. Even when they are added at a small amount to a matrix, they can be distributed uniformly over the matrix. Therefore, with respect to electrical conductivity, it is possible to obtain good electrical conductive paths throughout the matrix even at a small dosage. With respect to mechanical and thermal properties, improvements can be expected in analogous fashions, since the carbon fibrous structures are distributed evenly as fillers over the matrix with only a small dosage Other aspects of the invention will be apparent from the following description and the appended claims.

DETAILED DESCRIPTION

Now, the present invention will be described in detail with reference to some embodiments which are not to be construed as limiting, and disclosed only for the purpose of facilitating the illustration and understanding of the present invention.

Figure 3:
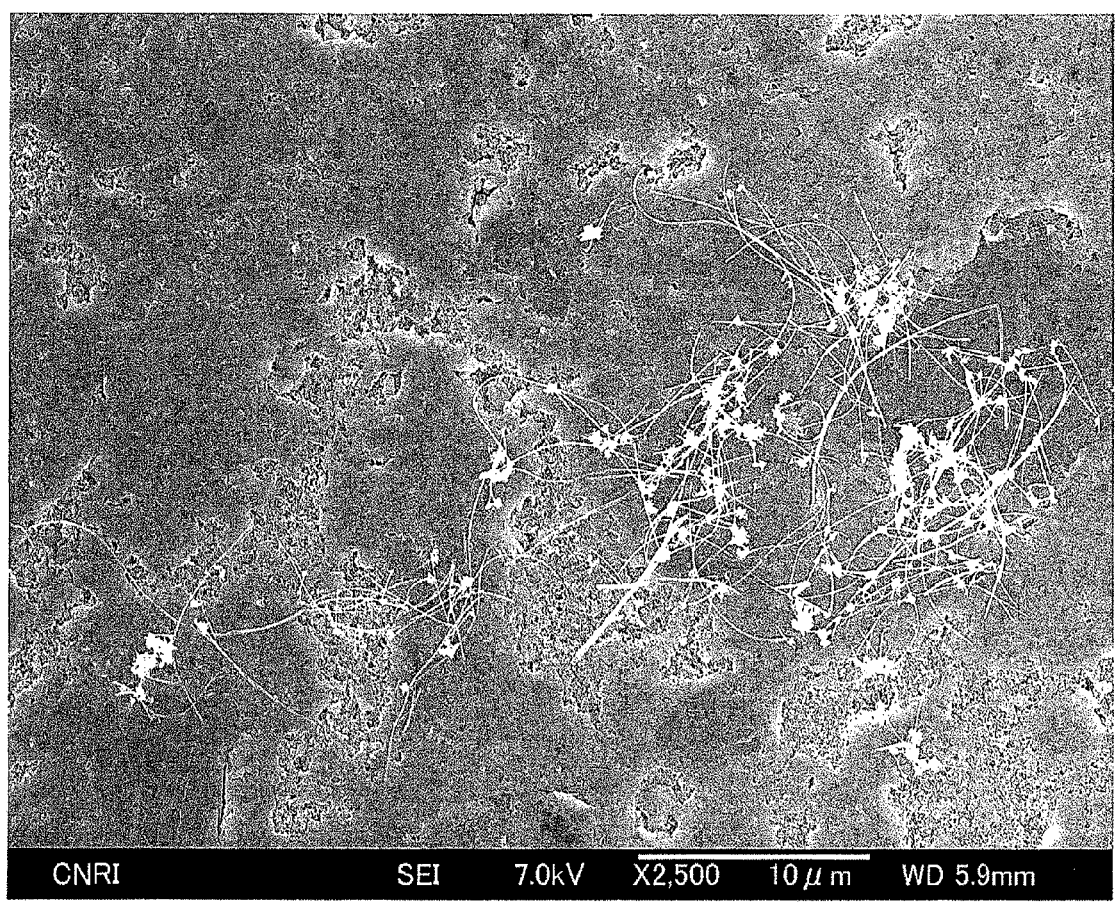
FIG. 3 is a scanning electron micrograph (SEM photo) of a carbon fibrous structure according to one embodiment of the present invention.
Figure 4A:
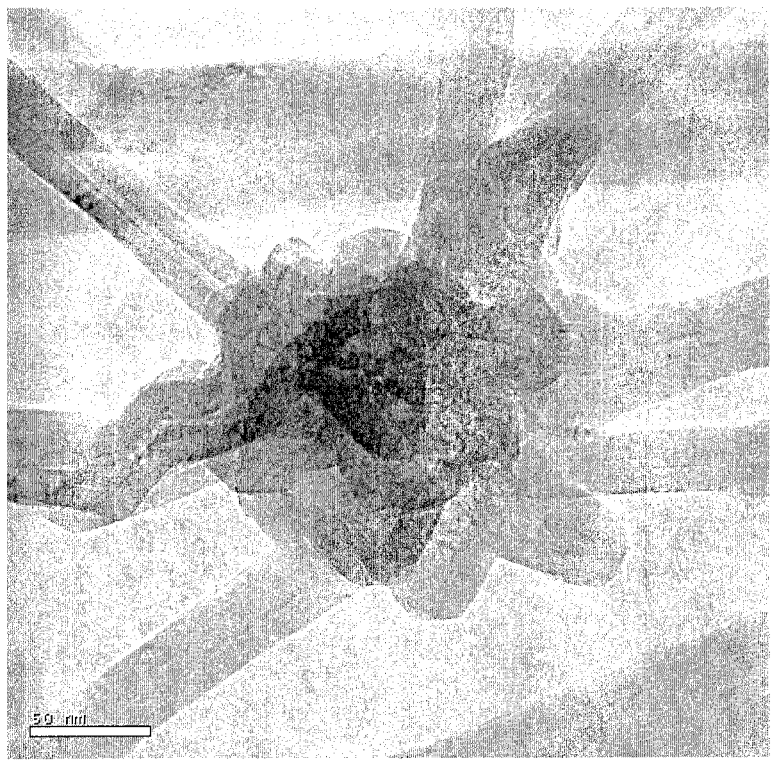
FIGS. 4A and 4B are transmission electron micrographs (TEM) of a carbon fibrous structure according to one embodiment of the present invention.
Figure 4B:
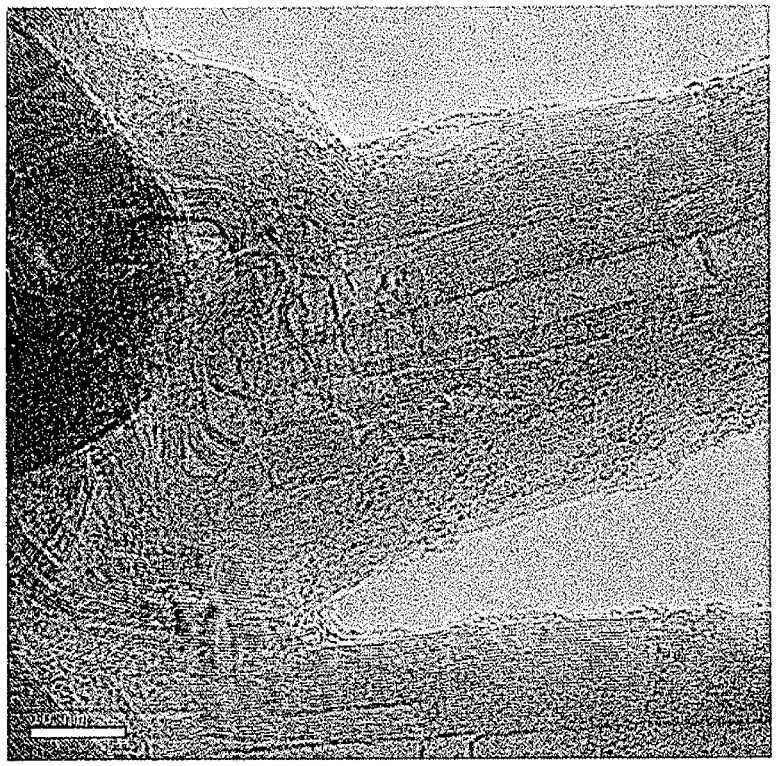

Carbon fibrous structures according to the present invention are, as shown in SEM photo of FIG. 3 and TEM photos of FIGS. 4A and 4B, composed of carbon fibers each having an outside diameter of 15-100 nm, and a granular part at which the carbon fibers are tied together so that the concerned carbon fibers are externally elongated (extend outwardly) from the granular part.

The reason for restricting the outside diameter of the carbon fibers to a range of 15 nm to 100 nm is because when the outside diameter is less than 15 nm, the cross-sections of the carbon fibers cannot have polygonal figures as described later. Given the same number of carbon atoms, the smaller the diameter of a fiber, the longer its length in the axial direction and the better its electrical conductivity. Thus, carbon fibrous structures having an outside diameter exceeding 100 nm are not preferred for use as modifiers or additives for a matrix such as a resin, etc. Particularly, it is more desirable for the outside diameter of the carbon fibers to be in the range of 20-70 nm. Carbon fibers that have a diameter within the preferable range and whose tubular graphene sheets are layered one by one in the direction that is orthogonal to the fiber axis, i.e., being of a multilayer type, can enjoy a high bending stiffness and ample elasticity. In other words, such fibers would easily restore to their original shape after undergoing any deformation. Therefore, even if the carbon fibrous structures have been compressed prior to being mixed into the matrix material, the fibers still tend to take a sparse structure in a matrix.

Annealing at a temperature of not less than 2400° C. causes the carbon fibers to have polygonal cross-sections. Additionally, annealing increases the true density of the carbon fiber from 1.89 g/cm$^3$ to 2.1 g/cm$^3$. As a result, the carbon fibers become denser and have fewer defects in both the stacking direction and the surface direction of the graphene sheets that make up the carbon fiber, and their flexural rigidity (EI) and dispersibility in a resin can also be enhanced and improved.

Additionally, it is preferable that the outside diameter of a fine carbon fiber varies along the axial direction of the fiber. In the case that the outside diameter of the carbon fiber is not constant, but changes along the length of the fiber, it would be expected that some anchoring effect may be provided to the carbon fiber at the fiber/matrix interface, and thus migration of the carbon fibrous structure in the matrix can be restrained, leading to improved dispersion stability.

Thus, in a carbon fibrous structure according to embodiments of the present invention, the three dimensional network configured fine carbon fibers having a predetermined outside diameter are bound together by a granular part produced in a growth process of the carbon fibers so that the carbon fibers are externally elongated from the granular part. Since multiple fine carbon fibers are not only entangled with each other, but are also fused together at the granular part, the carbon fibers will not disperse as single fibers, but will be dispersed as bulky carbon fibrous structures when added to a matrix such as a resin. Also since the fine carbon fibers are bound together by a granular part produced in the growth process of the carbon fibers, in a carbon fibrous structure according to embodiments of the present invention, the carbon fibrous structure itself can enjoy superior properties such as electrical property. For instance, when determining electrical resistance under a certain pressed density, carbon fibrous structures according to embodiments of the present invention have an extremely low resistivity, as compared with that of a simple aggregate of the fine carbon fibers and that of the carbon fibrous structures in which the fine carbon fibers are fixed at contacting points with a carbonaceous material or carbonized after the synthesis of the carbon fibers. Thus, when carbon fibrous structures according to embodiments of the present invention are added and distributed in a matrix, they can form good conductive paths within the matrix.

Figure 2:
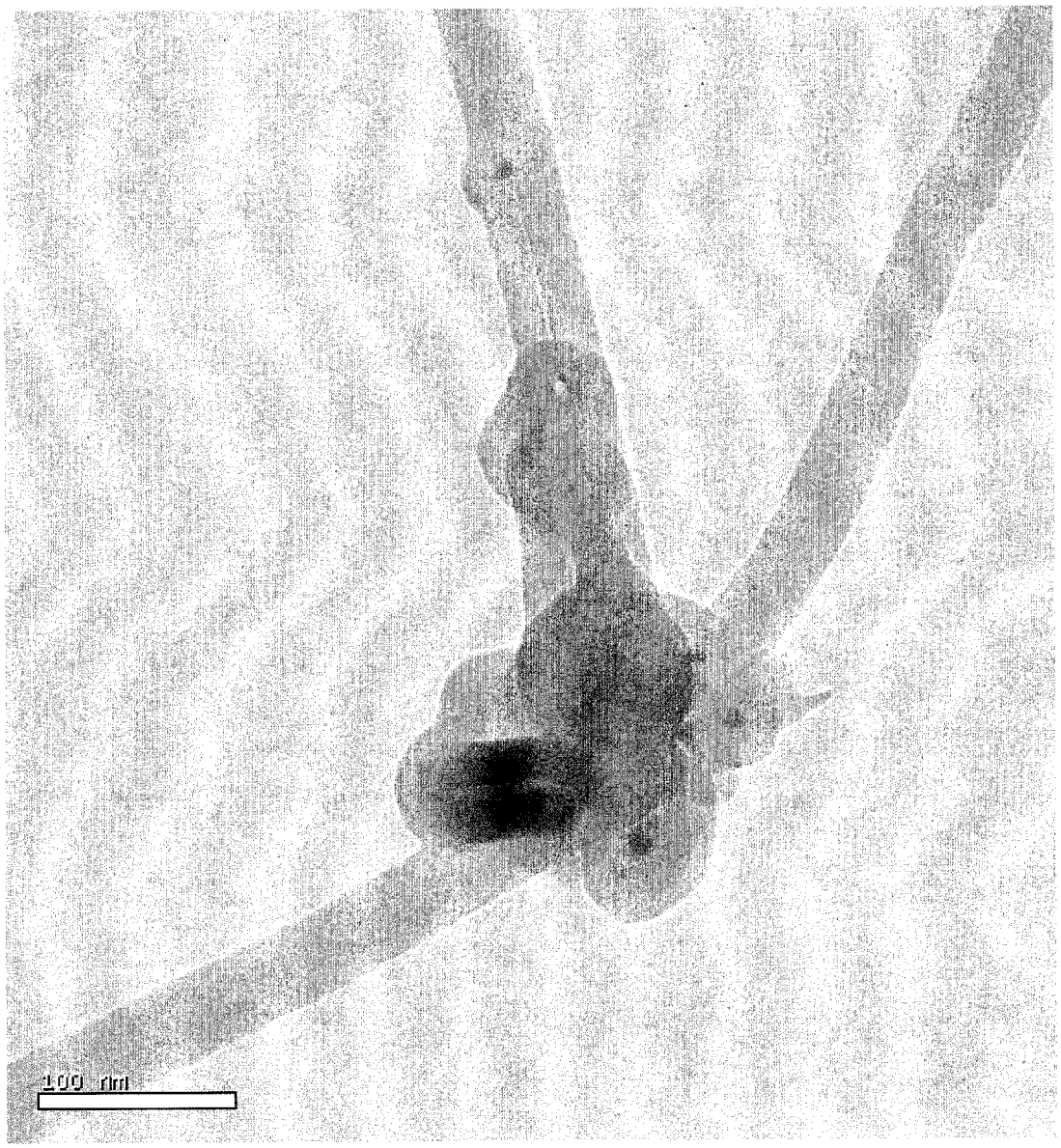
FIG. 2 is a transmission electron micrograph (TEM photo) of an intermediate for the carbon fibrous structure according to one embodiment of the present invention.

Furthermore, although not specifically limited, it is preferable that the diameter of the granular part is larger than the outside diameter of the carbon fibers as shown in FIG. 2. When the granular part, which is the binding site of the carbon fibers, has a much larger particle diameter, the carbon fibers that are externally elongated from the granular part have stronger binding force, and thus, even when the carbon fibrous structures are exposed to a relatively high shear stress during combining with a matrix such as resin, they can be dispersed as bulky carbon fibrous structures into the matrix. The "particle diameter of the granular part" used herein is the value which is measured by assuming that the granular part, which is the binding site for the mutual carbon fibers, is one spherical particle.

In carbon fibrous structures according to embodiments of the present invention, it is preferable that the carbon fibrous structure has an area-based circle-equivalent mean diameter of 50-100 µm. The "area-based circle-equivalent mean diameter" used herein is the value which is determined by taking a picture for the outside shapes of the carbon fibrous structures with a suitable electron microscope, etc., tracing the contours of the respective carbon fibrous structures in the obtained picture using a suitable image analysis software, e.g., Win-Roof™ (Mitani Corp.), and measuring the area within each individual contour, calculating the circle-equivalent mean diameter of each individual carbon fibrous structure, and then, averaging the calculated data.

Although it is not to be applied in all cases because the circle-equivalent mean diameter may be influenced by the kind of matrix material, e.g. a resin, to be complexed, the circle-equivalent mean diameter may become a factor by which the maximum length of a carbon fibrous structure upon combining into a matrix such as a resin is determined. In general, when the circle-equivalent mean diameter is not more than 50 µm, the electrical conductivity of the obtained composite may not be expected to reach a sufficient level, while when it exceeds 100 µm, an undesirable increase in viscosity may be expected to happen upon kneading of the carbon fibrous structures in the matrix. The increase in viscosity may be followed by failure of dispersion or may result in an inferior moldability.

Furthermore, the carbon fibrous structure according to embodiments of the present invention may exhibit a bulky, loose form in which the carbon fibers are sparsely dispersed, because the carbon fibrous structure is comprised of carbon fibers that are configured three dimensionally and are bound together by a granular part so that the carbon fibers are externally elongated from the granular part as mentioned above. It is desirable that the bulk density thereof is in the range of 0.0001-0.05 g/cm$^3$, more preferably, 0.001-0.02 g/cm$^3$. When the bulk density exceeds 0.05 g/cm$^3$, improvement of the physical properties in a matrix such as a resin would become difficult with a small dosage.

Furthermore, a carbon fibrous structure according to embodiments of the present invention can enjoy good electrical properties in itself, since the carbon fibers in the structure are bound together by a granular part produced in the growth process of the carbon fibers as mentioned above. For instance, it is desirable that a carbon fibrous structure according to embodiments of the present invention has a resistance determined under a certain pressed density (0.8 g/cm$^3$) of not more than 0.02 Ω·cm, more preferably, 0.001 to 0.10 Ω·cm. If the particle's resistance exceeds 0.02 Ω·cm, it may become difficult to form good conductive paths when the structure is added to a matrix such as a resin.

In order to enhance the strength and electrical conductivity of a carbon fibrous structure according to embodiments of the present invention, it is desirable that the graphene sheets that make up the carbon fibers have a minimum number of defects, and more specifically, for example, the $I_D/I_G$ ratio of the carbon fiber determined by Raman spectroscopy is not more than 0.2, more preferably, not more than 0.1. Incidentally, in Raman spectroscopic analysis, with respect to a large single crystal graphite, only the peak (G band) at 1580 cm$^{-1}$ appears. When the crystals are of finite minute sizes or have any lattice defects, the peak (D band) at 1360 cm$^{-1}$ can appear. Therefore, when the peak intensity (or magnitude) ratio (R=$I_{1360}$/$I_{1580}$=$I_D/I_G$) of the D band and the G band is below the selected range as mentioned above, it is possible to say that there is little defect in graphene sheets.

Furthermore, it is desirable that the carbon fibrous structure according to embodiments of the present invention has a combustion initiation temperature in air of not less than 750° C., preferably, 800° C.-900° C. Such a high thermal stability would be brought about by the above mentioned facts that it has little defects and that the carbon fibers have a predetermined outside diameter.

A carbon fibrous structure according to embodiments of the present invention having the above-described desirable form may be prepared as follows.

Basically, an organic compound such as a hydrocarbon is thermally decomposed through the CVD (Chemical Vapor Deposition) process in the presence of ultraminute particles of a transition metal as a catalyst in order to obtain a fibrous structure (hereinafter referred to as an "intermediate"), and then the intermediate thus obtained undergoes a high temperature heating treatment.

As a raw material organic compound, hydrocarbons such as benzene, toluene, xylene; carbon monoxide (CO); and alcohols such as ethanol may be used. It is preferable, but not limited, to use as carbon sources at least two carbon compounds which have different decomposition temperatures. Incidentally, the words "at least two carbon compounds" used herein not only include two or more kinds of raw materials, but also include one kind of raw material that can undergo a fragmentation or decomposition reaction, such as hydrodealkylation of toluene or xylene, during the course of synthesis of the fibrous structure such that in the subsequent thermal decomposition (CVD) procedure it can function as at least two kinds of carbon compounds having different decomposition temperatures.

Inert gases such as argon, helium, xenon and hydrogen may be used as an atmosphere gas (or carrier gas).

A mixture of transition metal such as iron, cobalt, molybdenum, or transition metal compounds such as ferrocene, metal acetate; and sulfur or a sulfur compound such as thiophene, ferric sulfide; may be used as a catalyst.

The intermediate may be synthesized using a CVD process with hydrocarbon or etc., which has been conventionally used in the art. The steps may comprise gasifying a mixture of hydrocarbon and a catalyst as a raw material, supplying the gasified mixture into a reaction furnace along with a carrier gas such as hydrogen gas, etc., and undergoing thermal decomposition at a temperature in the range of 800° C.-1300° C. By following such synthesis procedures, the product obtained is an aggregate, which is of several to several tens of centimeters in size and which is composed of plural carbon fibrous structures (intermediates), each of which show a three dimensional configuration where fibers having 15-100 nm in outside diameter are bound together by a granule that has been grown around the catalyst particle as the nucleus.

The thermal decomposition reaction of the hydrocarbon raw material mainly occurs on the surface of the catalyst particles or on growing surface of granules that have grown around the catalyst particles as the nucleus, and the fibrous growth of carbon may be achieved when the recrystallization of the carbons generated by the decomposition progresses in a constant direction. When obtaining carbon fibrous structures according to embodiments of the present invention, however, the balance between the decomposition rate and the carbon fiber growth rate is intentionally varied. Namely, for instance, as mentioned above, to use as carbon sources at least two kinds of carbon compounds having different decomposition temperatures may allow the carbonaceous material to grow three dimensionally around the particle as a centre, rather than in one dimensional direction. The three dimensional growth of the carbon fibers depends not only on the balance between the decomposition rate and the growing rate, but also on the selectivity of the crystal face of the catalyst particle, residence time in the reaction furnace, temperature distribution in the furnace, etc. The balance between the decomposition rate and the growing rate is affected not only by the kinds of carbon sources mentioned above, but also by reaction temperatures, and gas temperatures, etc. Generally, when the growing rate is faster than the decomposition rate, the carbon material tends to grow into fibers, whereas when the decomposition rate is faster than the growing rate, the carbon material tends to grow in peripheral directions of the catalyst particle. Accordingly, by changing the balance between the decomposition rate and the growing rate intentionally, it is possible to control the growth of carbon material to occur in multi-direction rather than in single direction, and to produce three dimensional structures according to embodiments of the present invention.

In order to form the above mentioned three-dimensional configuration, where the fibers are bound together by a granule, with ease, it is desirable to optimize the compositions such as the catalyst used, the residence time in the reaction furnace, the reaction temperature and the gas temperature.

The intermediate, obtained by heating the mixture of the catalyst and hydrocarbon at a constant temperature in the range of 800° C.-1300° C., has a structure that resembles sheets of carbon atoms laminated together, (and being still in half-raw, or incomplete condition). When analyzed with Raman spectroscopy, the D band of the intermediate is very large and many defects are observed. Further, the obtained intermediate is associated with unreacted raw materials, non-fibrous carbon, tar moiety, and catalyst metal.

Therefore, the intermediate is subjected to a high temperature heat treatment using a proper method in order to remove such residues from the intermediate and to produce the intended carbon fibrous structure with few defects.

For instance, the intermediate may be heated at 800-1200° C. to remove the unreacted raw material and volatile flux such as the tar moiety, and thereafter annealed at a high temperature of 2400-3000° C. to produce the intended structure and, concurrently, to vaporize the catalyst metal, which is included in the fibers, to remove it from the fibers. In this process, it is possible to add a small amount of a reducing gas and carbon monoxide into the inert gas atmosphere to protect the carbon structures.

By annealing the intermediate at a temperature of 2400-3000° C., the patch-like sheets of carbon atoms are rearranged to associate mutually and then form multiple graphene sheet-like layers.

After or before such a high temperature heat treatment, the aggregates may be subjected to crushing in order to obtain carbon fibrous structures, each having an area-based circle-equivalent mean diameter of several centimeters. Then, the obtained carbon fibrous structures may be subjected to pulverization in order to obtain the carbon fibrous structures having an area-based circle-equivalent mean diameter of 50-100 μm. It is also possible to perform the pulverization directly without crushing. On the other hand, the initial aggregates involving plural carbon fibrous structures according to embodiments of the present invention may also be granulated for adjusting shape, size, or bulk density to one's suitable for using in a particular application. More preferably, in order to utilize effectively the above structure formed from the reaction, the annealing would be performed in a state such that the bulk density is low (the state that the fibers are extended as much as they can and the voidage is sufficiently large). Such a state may contribute to improved electric conductivity of a resin matrix.

The carbon fibrous structures according to embodiments of the present invention may have the following properties:
A) a low bulk density;
B) a good dispersibility in a matrix such as resin;
C) a high electrical conductivity;
D) a high heat conductivity;
E) a good slidability;
F) a good chemical stability;
G) a high thermal stability; and etc.

Thus, a carbon fiber of the invention can be used in a wide range of applications, for example, as a filler for composite material to be added to solid materials such as resins, ceramics, metals, and etc., or as an additive to liquid materials such as, fuels, lubricating oils, and etc.

The following are examples of various applications according to their functionalities. These examples are for illustration only and are not intended to limit the scope of the invention.

1) Composites Having Electrical Conductivity

For example, by combining carbon fibers of the invention with a resin, the resultant conductive resin and conductive resin molded body may be suitably used as wrapping material, gasket, container, resistance body, conductive fiber, electric wire, adhesive, ink, paint, and etc. Similar effects can be expected from composite materials in which the carbon fibers are added to an inorganic material, particularly, ceramic, metal, and etc., in addition to the above mentioned composite with a resin.

2) Composites Having Heat Conductivity

It is possible to add the carbon fibers to fuels to improve heat conduction, in addition to the above applications wherein electric conductivity is utilized.

3) Electromagnetic Wave Shields

By combining carbon fibers with a resin, the resulting resin can be suitably used as electromagnetic wave shielding paint as well as electromagnetic wave shielding material for molding.

4) Composites Having Unique Physical Characteristics

By combining them into a matrix such as a resin or a metal to improve the sliding ability of the matrix, which can then be used for rollers, brake parts, tires, bearings, lubricating oils, cogwheels, pantographs, and etc.

Also, by taking advantage of their light-weight and toughness, they can be used in wires, bodies of consumer electronics, cars or airplanes, housing of machines, and etc.

Additionally, it is possible to use them as a substitute for conventional carbon fibers or beads, as well as use in polar materials of batteries, switches, vibration dampers and etc.

5) Liquids with Enhanced Thermal Stability

In order to improve the safety of flammable liquids such as fuels, lubricating oils, etc., during storage or transportation, the carbon fibers may be added to the flammable liquids.

EXAMPLES

Hereinafter, this invention will be illustrated in detail by practical examples. However, it is to be understood that the examples are given for illustrative purpose only, and the invention is not limited thereto.

The respective physical properties illustrated later are measured by the following protocols.

1) Area Based Circle-Equivalent Mean Diameter

First, a photograph of pulverized products was taken with SEM. On the taken SEM photo, only carbon fibrous structures with a clear contour were taken as objects to be measured, and broken ones with unclear contours were omitted. Using all carbon fibrous structures that can be taken as objects in one single field of view (approximately, 60-80 pieces), about 200 pieces in total were measured with three fields of views. Contours of the individual carbon fibrous structures were traced using the image analysis software, WinRoof™ (Mitani Corp.), and area within each individual contour was measured, circle-equivalent mean diameter of each individual carbon fibrous structure was calculated, and then, the calculated data were averaged to determine the area based circle-equivalent mean diameter.

2) Bulk Density 1 g of powder was placed into a 70 mm caliber transparent cylinder equipped with a distribution plate, then air supply at 0.1 Mpa of pressure, and 1.3 liter in capacity was applied from the lower side of the distribution plate in order to blow off the powder and thereafter allowed the powder to settle naturally. After the fifth air blowing, the height of the settled powder layer was measured. Any 6 points were adopted as the measuring points, and the average of the 6 points was calculated in order to determine the bulk density.

3) Raman Spectroscopic Analysis

The Raman spectroscopic analysis was performed with LabRam 800 manufactured by HORIBA JOBIN YVON, S.A.S., using 514 nm argon laser.

4) TG Combustion Temperature

Combustion behavior was determined using TG-DTA manufactured by MAX SCIENCE CO. LTD., at air flow rate of 0.1 liter/minute and heating rate of 10° C./minute. When burning, TG indicates a quantity reduction and DTA indicates an exothermic peak. Thus, the top position of the exothermic peak was defined as the combustion initiation temperature.

5) X Ray Diffraction

Using the powder X ray diffraction equipment (JDX3532, manufactured by JEOL Ltd.), carbon fiber structures after annealing processing were determined. Kα ray which was generated with Cu tube at 40 kV, 30 mV was used, and the measurement of the spacing was performed in accordance with the method defined by The Japan Society for the Promotion of Science (JSPS), described in "Latest Experimental Technique For Carbon Materials (Analysis Part)", Edited by Carbon Society of Japan, 2001), and as the internal standard silicon powder was used. The related parts of this literature are incorporated herein by reference.

6) Particle's Resistance and Decompressibility 1 g of CNT powder was scaled, and then press-loaded into a resinous die (inner dimensions: 40 liters, 10 W, 80 Hmm), and the displacement and load were read out. A constant current was applied to the powder by the four-terminal method, and in this condition the voltage was measured. After measuring the voltage until the density came to 0.9 g/cm$^3$, the applied pressure was released and the density after decompression was measured. Measurements taken when the powder was compressed to 0.5, 0.8 or 0.9 g/cm$^3$ were adopted as the particle's resistance.

Example 1

By the CVD process, carbon fibrous structures were synthesized using toluene as the raw material.

Figure 1:
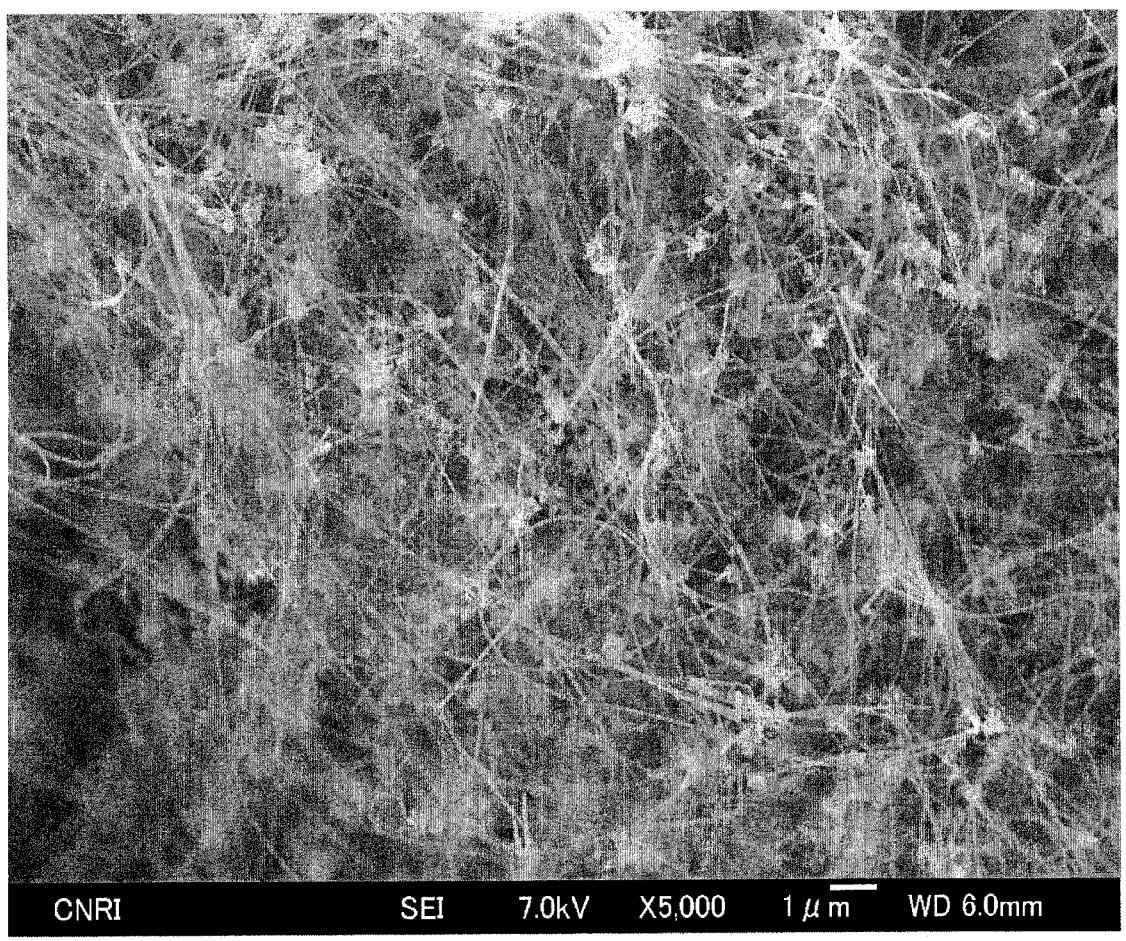
FIG. 1 is a scanning electron micrograph (SEM photo) of an intermediate for the carbon fibrous structure according to one embodiment of the present invention.

The synthesis was carried out in the presence of a mixture of ferrocene and thiophene as the catalyst, and under the reducing atmosphere of hydrogen gas. Toluene and the catalyst were heated to 380° C. along with the hydrogen gas, and then they were supplied to the generation furnace, and underwent thermal decomposition at 1250° C. in order to obtain the carbon fibrous structures (first intermediate). The synthesized first intermediate was baked at 900° C. in nitrogen gas in order to remove hydrocarbons such as tar and to obtain a second intermediate. The R value of the second intermediate measured by the Raman spectroscopic analysis was found to be 0.98. Sample for electron microscopes was prepared by dispersing the first intermediate into toluene. FIGS. 1 and 2 show SEM photo and TEM photo of the sample, respectively.

Further, the second intermediate underwent a high temperature heat treatment at 2600° C. The obtained aggregates of the carbon fibrous structures underwent pulverization using an air flow pulverizer in order to produce the carbon fibrous structures according to the present invention. A sample for electron microscopes was prepared by dispersing ultrasonically the obtained carbon fibrous structures into toluene. FIGS. 3, and 4A and 4B show SEM photo and TEM photos of the sample, respectively.

Figure 5:
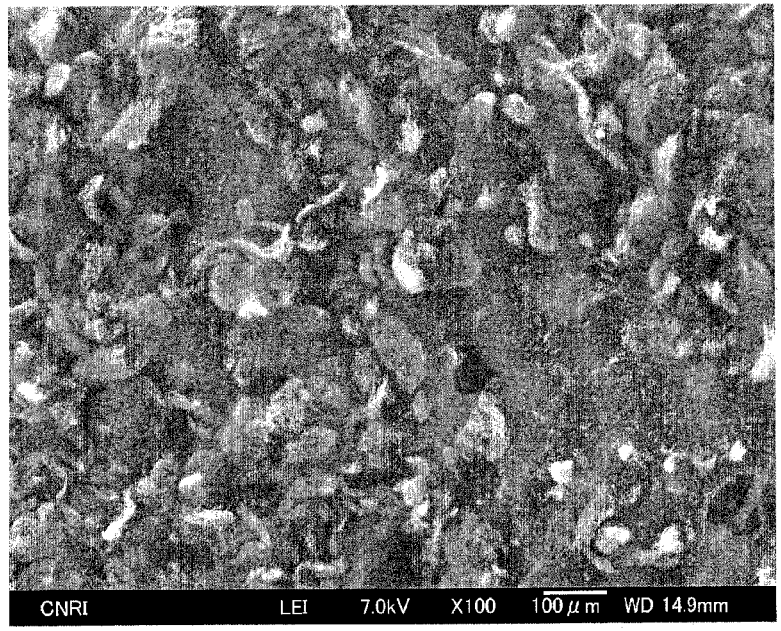
FIG. 5 is another scanning electron micrograph (SEM photo) of a carbon fibrous structure according to another embodiment of the present invention.

FIG. 5 shows SEM photo of the obtained carbon fibrous structures as mounted on a sample holder for electron microscope, and Table 1 shows the particle distribution of obtained carbon fibrous structures.

Figure 6:
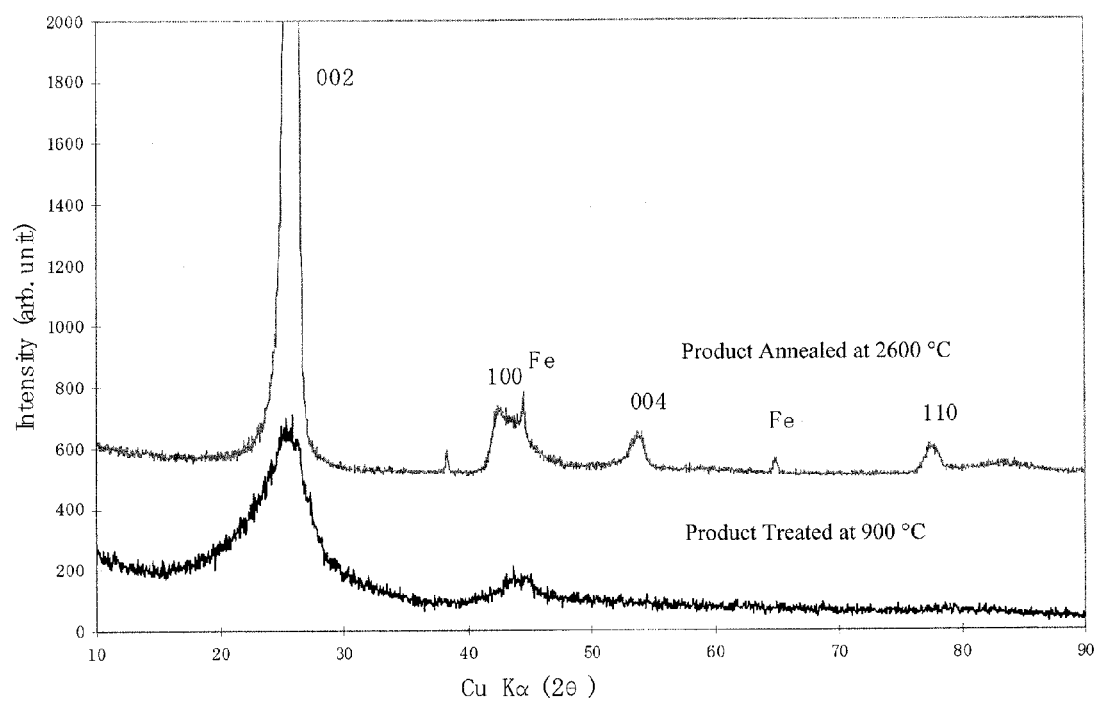
FIG. 6 is an X-ray diffraction chart of a carbon fibrous structure according to one embodiment of the present invention and an intermediate thereof.
Figure 7:
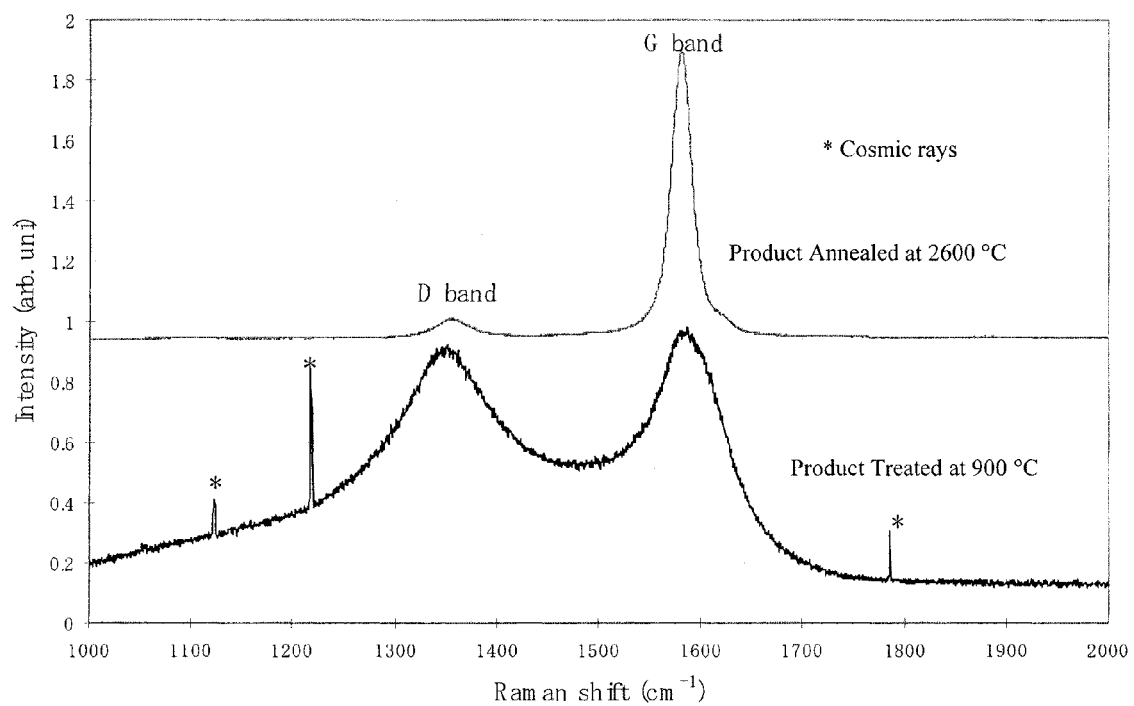
FIG. 7 is Raman spectra of a carbon fibrous structure according to one embodiment of the present invention and an intermediate thereof.

Further, X-ray diffraction analysis and Raman spectroscopic analysis were performed on the carbon fibrous structure before and after the high temperature heat treatment in order to examine changes in these analyses. The results are shown in FIGS. 6 and 7, respectively.

Additionally, it was found that the carbon fibrous structures had an area based circle-equivalent mean diameter of 72.8 μm, bulk density of 0.0032 g/cm$^3$, Raman $I_D/I_G$ ratio of 0.090, TG combustion temperature of 786° C., spacing of 3.383, particle's resistance of 0.0083 Ω·cm, and density after decompression of 0.25 g/cm³.

Separately, 0.22 g of the obtained carbon fibrous structures were added to 10 g of an epoxy resin (ADEKA RESIN EP™ 4100E, epoxy equivalent: 190, manufactured by Asahi Denka Co., Ltd.) and a hardener (ADEKA HARDENER EH3636-AS, manufactured by Asahi Denka Co., Ltd.) and the content of the carbon fibrous structures was adjusted to be 2% by weight. After 10 minutes of mixing, the mixture was developed to a film using a doctor blade with a gap of 200 μm. The film was then hardened at 170° C. for 30 minutes, and the hardened film was analyzed for its surface electrical resistance. It was found to be 276 Ω/cm².

Figure 8:
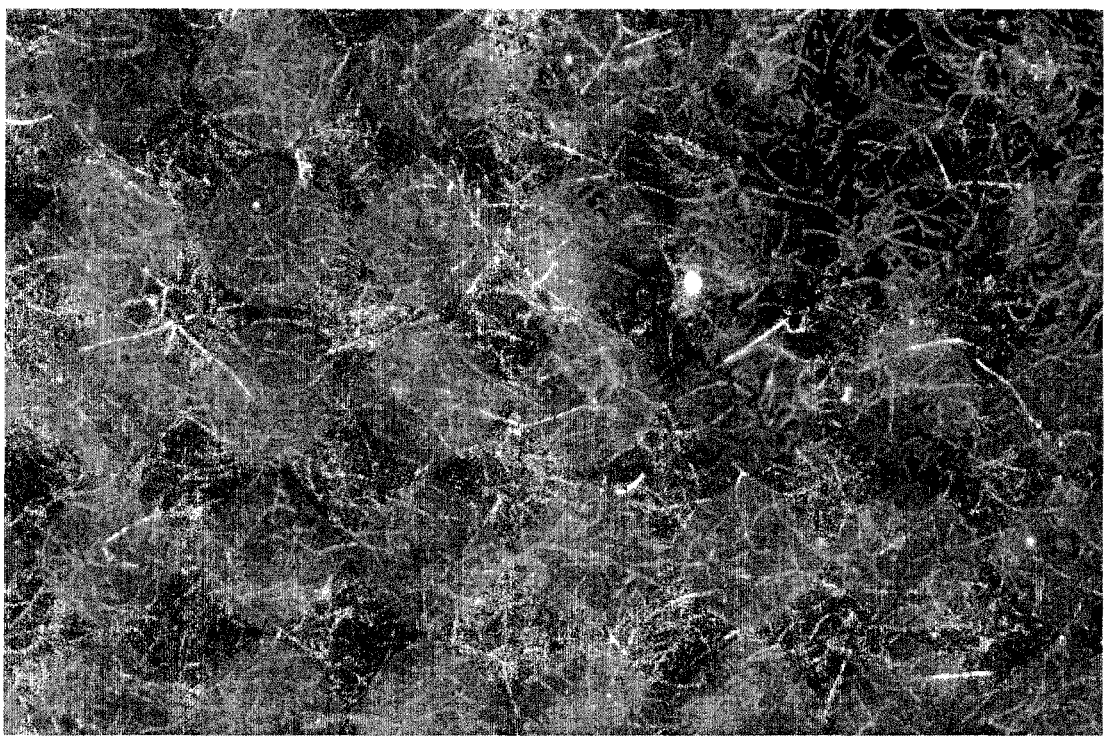
FIG. 8 is an optical microphotograph of a composite material where a carbon fibrous structure according to one embodiment of the present invention is used.

Another similar epoxy resin composite film were prepared as above mentioned except the content of the carbon fibrous structures was set to be 0.5% by weight. The optical micrograph of the film is shown in FIG. 8. It is apparent from FIG. 8 that the carbon fibrous structures showed a good dispersibility in the resin matrix.

Table 2 provides a summary of the various physical properties as determined in the above example.

TABLE 1

| Particle Distribution (pieces) | |
|---|---|
| <50 μm | 49 |
| 50 μm to <60 μm | 41 |
| 60 μm to 70 μm | 34 |
| 70 μm to <80 μm | 32 |
| 80 μm to <90 μm | 16 |
| 90 μm to <100 μm | 12 |
| 100 μm to <110 μm | 7 |
| >110 μm | 16 |
| Area based circle-equivalent mean diameter | 72.8 μm |

TABLE 2

| | Example 1 |
|---|---|
| Area based circle-equivalent mean diameter | 72.8 μm |
| Bulk density | 0.0032 g/cm³ |
| $I_D/I_G$ ratio | 0.090 |
| TG combustion temperature | 786° C. |
| Spacing for (002) faces | 3.383 Å |
| Particle's resistance at 0.5 g/cm³ | 0.0173 Ω·cm |
| Particle's resistance at 0.8 g/cm³ | 0.0096 Ω·cm |
| Particle's resistance at 0.9 g/cm³ | 0.0083 Ω·cm |
| Density after decompression | 0.25 g/cm³ |

The present invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming a carbon fibrous structure having a plurality of granular parts to which a plurality of carbon fibers are bound, the method comprising:
    heating a mixture of a carbon source and a catalyst at a temperature between 800° C. and 1300° C. to produce aggregates of a first intermediate, wherein the plurality of granular parts are connected with each other through entanglement of the carbon fibers that extend outwardly from the granular parts, thereby forming a three dimensional network of carbon fibrous structure;
    heating the aggregates of the first intermediate to remove hydrocarbons, at a temperature between 800° C. and 1200° C. to produce aggregates of a first product;
    heating the aggregates of the first product at a temperature between 2400° C. and 3000° C. to produce aggregates of a final product; and
    pulverizing the aggregates of the final product such that area-based circle-equivalent mean diameter of each aggregate of the carbon fibrous structure of the product is 50-100μm, a bulk density of the carbon fibrous structure is 0.0001-0.02 g/cm³, and a powder resistance measured under a pressed density of 0.8g/cm³ is not more than 0.02Ω·cm.

2. The method of claim 1, wherein the pulverizing is performed using an air flow pulverizer.

3. The method of claim 1, wherein the carbon source comprises at least two compounds having different decomposition temperatures.

4. The method of claim 1, wherein the carbon source comprises a compound that can produce, when heated at a temperature between 800° C. and 1300° C., at least two components having different decomposition temperatures.

5. The method of claim 4, wherein the compound is an alkylaromatic compound.

6. The method of claim 5, wherein the alkylaromatic compound is toluene or xylene.

7. The method of claim 1, wherein the catalyst is an iron-containing catalyst.

8. The method of claim 7, wherein the carbon source comprises at least two compounds having different decomposition temperatures.

9. The method of claim 7, wherein the carbon source comprises a compound that can produce, when heated at a temperature between 800° C. and 1300° C., at least two components having different decomposition temperatures.

10. The method of claim 9, wherein the compound is an alkylaromatic compound.

11. The method of claim 10, wherein the alkylaromatic compound is toluene or xylene.

12. The method of claim 1, wherein the mixture of the carbon source and the catalyst is introduced into a reaction chamber in a gaseous state, without a substrate.

13. The method of claim 12, wherein the catalyst is an iron-containing catalyst.

14. The method of claim 13, wherein the carbon source comprises at least two compounds having different decomposition temperatures.

15. The method of claim 13, wherein the carbon source comprises a compound that can produce, when heated at a temperature between 800° C. and 1300° C., at least two components having different decomposition temperatures.

16. The method of claim 15, wherein the compound is an alkylaromatic compound.

17. The method of claim 16, wherein the alkylaromatic compound is toluene or xylene.

18. A method for forming a carbon fibrous structure having a plurality of granular parts to which a plurality of carbon fibers are bound, the method comprising:

heating a mixture of a carbon source and a catalyst at a temperature between 800° C. and 1300° C. to produce aggregates of an intermediate, wherein the carbon source comprises at least two compounds having different decomposition temperatures, and wherein the heating is performed under conditions that a rate of thermal decomposition of the carbon source and a rate of fiber growth are balanced;

crushing the aggregates of the intermediate;

heating the crushed aggregates of the intermediate at a temperature between 2400° C. and 3000 ° C. to produce aggregates of a final product; and pulverizing the aggregates of the final product such that an area-based circle-equivalent mean diameter of each aggregate of the carbon fibrous structure of the final product is 50-100μm and a bulk density of the carbon fibrous structure is 0.0001-0.02 g/cm$^3$ and a powder resistance measured under a pressed density of 0.8g/cm$^3$ is not more than 0.02 Ω·cm.

19. The method for forming a carbon fibrous structure according to claim 18, wherein the pulverizing is performed using an air flow pulverizer.

20. The method for forming a carbon fibrous structure according to claim 18, wherein an outside diameter of the carbon fibers is 15-100 nm.

21. The method for forming a carbon fibrous structure according to claim 18, wherein an intensity ratio of D band and G band ($I_D/I_G$) of the carbon fibers as determined by Raman spectroscopy is not more than 0.2.

22. The method for forming a carbon fibrous structure according to claim 18, wherein an outside diameter of each granular part is larger than an outside diameter of each of the carbon fibers.

23. The method for forming a carbon fibrous structure according to claim 18, wherein the plurality of carbon fibers are fused together at the granular parts during formation of the carbon fibrous structure.

* * * * *